2,800,499

PURIFICATION OF HERBICIDAL PHENOXY-ACETIC ACID ESTERS WITH CHLORINE

Frederick M. M. J. Hager, Elmira, Ontario, Canada, assignor to United States Rubber Company, New York, N. Y., a corporation of New Jersey No Drawing. Application March 30, 1955,
Serial No. 498,117

6 Claims. (Cl. 260—473)

This invention relates to a method of improving the quality of compositions comprising esters of 2,4-dichloro- or 2,4,5-trichloro-phenoxyacetic acid, hereinafter referred to as esters of 2,4-D and 2,4,5-T, and more particularly it relates to a method of converting such compositions from a dark, opaque condition to an essentially translucent, relatively clear condition of light color.

The esters of 2,4-D and 2,4,5-T as prepared from technical grades of alcohols and acids by commercial methods for use in herbicidal compositions are characterized in their crude form by an undesirable deep and almost black color that renders even small volumes of the product virtually opaque. The principal object of the present invention is to provide a convenient method for substantially reducing such color and opacity, that is practical and economical and adaptable to practice on a large commercial scale.

The invention is based on the unexpected discovery that when crude commercial 2,4-D or 2,4,5-T esters are subjected to the action of minute amounts of chlorine gas, there takes place almost instantaneously a radical and dramatic change in the appearance of the crude ester, to provide a material which is by contrast essentially translucent and clear, and which displays only a relatively pale color instead of the original dark, almost black, appearance.

The crude ester preparations on which the invention is practiced are prepared in a known manner as disclosed, for example, in U. S. Patent 2,614,919 of Warren and Hager, by heating to reflux temperature an alcohol such as n-butanol, glycerol, butoxyethanol, polypropylene glycol, isooctyl alcohol, lauryl alcohol, etc., or mixtures thereof, together with the appropriate chlorophenoxyacetic acid or acids, usually in the presence of an esterification catalyst and a volatile entraining agent which serves to remove the water of esterification as the reaction proceeds. Such removal of the water of esterification of course leaves the ester substantially anhydrous. The treatment of the invention may be carried out directly on the crude reaction mixture at the completion of the esterification reaction, after which the catalyst, if any, is neutralized and any remaining entraining agent or unreacted alcohol is distilled off, usually with the aid of vacuum. Alternatively, the decolorizing treatment of the invention may be carried out after the catalyst is neutralized and before the vacuum stripping. In another method of practicing the invention, the treatment with chlorine is effected after the vacuum stripping.

The treatment of the invention is highly effective in the cold (e. g., at room temperature), but it may also be carried out at elevated temperatures (e. g., 60° to 150° C.) if desired, and although deliberate heating of the ester to such elevated temperatures is not necessary for purposes of the invention it may sometimes be found convenient to carry out the treatment of the invention while the ester mixture is still hot from the reaction or stripping steps.

Surprisingly small amounts of chlorine gas are completely effective in the method of the invention, and therefore it is necessary to subject the crude ester to only the slightest trace of chlorine gas to effect the desired improvement. As little as 0.01% of chlorine gas on the weight of the ester is ample for producing marked improvement, and in practice we generally do not employ more than about 0.1 to 0.5%. Although considerably larger amounts (e. g., more than 1%) may be employed without harm if desired, there is no proportionate added advantage in doing so, and therefore for reasons of economy we do not ordinarily employ more than the merest trace of chlorine gas.

The chlorine gas may be introduced over the surface of the ester preparation contained in a suitable vessel that provides some free space above the surface of the liquid. Also, the chlorine gas may be introduced below the surface of the ester, through a suitable gas diffusing arrangement submerged in the ester. As indicated previously, the action of the chlorine gas is virtually instantaneous and the improvement in appearance is noticed almost immediately the gas is introduced.

In the preferred practice of the invention the treated ester is thereafter swept or purged by blowing therethrough a stream of gas inert toward the ester, such as air, nitrogen, or carbon dioxide, to remove the bulk of any remaining chlorine gas. The outgoing stream of gas appears to contain also some hydrogen chloride which is evidently somehow formed in the course of the process.

The gas thus used to blow the treated ester should be free from undue quantities of moisture, since the ester will otherwise become turbid looking. If necessary, the purging gas may be passed over a drying agent such as calcium chloride before being introduced into the ester.

Any excess chlorine or any remaining hydrogen chloride present in the mixture may also be removed by suitable treatment with small quantities of any known acceptors or neutralizing agents for chlorine or hydrogen chloride, such as propylene oxide or basic materials such as isopropylamine or calcium hydroxide, or equivalent neutralizers or acceptors.

The following examples will serve to illustrate the practice of the invention in more detail.

Example I

Added one part by weight of chlorine, above the surface, to 500 parts of mixed butyl ester of 2,4-D, which had been previously heated to 90° C. The mixture was agitated for five minutes; the color changed from the original Gardner 12 to a Gardner 6.5. The mixture was then cooled to 60° C. and then blown for ten minutes with nitrogen to remove excess chlorine and the HCl which is formed. The final color was Gardner 7.

Example II

Same as Example I but the chlorine was added subsurface with a dip tube. The color change was identical to that of Example I.

Example III

Added one pound of chlorine to 550 pounds of mixed butyl ester of 2,4–D which contained 50 pounds of mixed butyl alcohol. The temperature was 90° C. Again the color changed from Gardner 12 to Gardner 7. The excess butyl alcohol was removed in 29 inches of vacuum and a final pot temperature of 120° C. The color increased to Gardner 8.

This method circumvents the use of an inert gas.

Example IV

Same as Example II but was carried out cold and used air instead of nitrogen. The color change was from Gardner 12 to Gardner 7.

Example V

Same as Example IV but used mixed butyl ester of 2,4,5-T. The color changed from Gardner 16 to Gardner 8.

Example VI

Same as Example IV but used 2,4-D mixed butyl ester of 2,4-D with an initial Gardner color of 8. Chlorine treatment lowered the color to Gardner 4.

Example VII

Same as Example IV but used isopropyl ester of 2,4-D. The color was changed from Gardner 9 to Gardner 5.

Example VIII

Same as Example VII but neutralized batch with five parts of 1:1 water:Ca(OH)$_2$ mixture directly after the chlorine treatment. The color changed from Gardner 9 to Gardner 4.

Example IX 0.5 part of chlorine was bubbled into 500 parts of mixed butyl esters of 2,4-D. The color changed from Gardner 16 to 8. 0.5 part of isopropyl amine was added to neutralize the hydrogen chloride and free chlorine.

Example X

Example IX was repeated, except that 0.5 part of propylene oxide was used to neutralize the hydrogen chloride and free chlorine. Thereafter, vacuum was applied to remove any unreacted propylene oxide.

From the foregoing it will be apparent that the invention affords a convenient and effective means for greatly reducing the color of preparations based on crude esters of 2,4-D or 2,4,5-T. The color change is so marked that small volumes of the ester which give the impression of being black and opaque before the treatment, appear only pale yellow and no longer opaque after the treatment.

The commercial importance of the invention will be appreciated when it is realized that the crude ester preparations heretofore available to the agricultural chemical trade have suffered a quality and sales disadvantage in marketing to formulators and users of the ester, because of the black, opaque appearance of the crude. The crude esters treated in the manner of the invention do not suffer from this disadvantage.

The advantages of the invention from the standpoint of convenience and economy will also be appreciated in view of the fact that purification methods such as vacuum distillation of the ester are slow, expensive, and of limited effectiveness, in addition to involving waste in the form of still residues.

The unexpectedness of the invention is also emphasized by the fact that numerous and diverse other decolorizing treatments do not produce the results obtainable by the invention. Treatments with typical reducing agents are not effective, and treatments with oxidizing agents produce only minor and unsatisfactory changes in color.

The adaptability of the invention to commercial operations in convenient and economical fashion is a consequence of the fact that the treatment may be carried out after the ester has been loaded into an ordinary tank car at the siding of the plant, preparatory to shipment to the formulator. It is only necessary to introduce into the free space in the top of the tank car a small amount of chlorine gas, and the entire contents of the tank car are thereby effectively decolorized. The invention therefore necessitates scarcely any additional processing or equipment. This treatment may be expedited by agitating the material in the tank car by any convenient means, such as by air injection or by the use of a circulating pump. The hydrogen chloride formed may be removed by blowing air through the tank.

Having thus described my invention, what I claim and desire to protect by Letters Patent is:

1. A method of treating a crude ester selected from the group consisting of esters of 2,4-dichlorophenoxy-acetic acid and esters of 2,4,5-trichlorophenoxyacetic acid, such ester being in a crude form characterized by opacity and deep color, comprising introducing into the ester from 0.01% to 1.0% of chlorine gas, whereby the ester becomes substantially decolorized.

2. A method as in claim 1, in which the thus-treated ester is thereafter blown with an inert gas.

3. A method as in claim 1, in which the thus-treated ester is thereafter treated with an acceptor of chlorine and hydrogen chloride.

4. A method as in claim 3 in which the said acceptor is propylene oxide.

5. A method as in claim 3 in which the said acceptor is a basic material.

6. A method as in claim 5 in which the basic material is isopropyl amine.

References Cited in the file of this patent

UNITED STATES PATENTS

| | | |
|---|---|---|
| 2,594,556 | Hartley | Apr. 29, 1952 |
| 2,602,091 | Dosser et al. | July 1, 1952 |
| 2,704,296 | Dobratz | Mar. 15, 1955 |